(12) United States Patent
Kronenberg et al.

(10) Patent No.: US 8,297,871 B2
(45) Date of Patent: Oct. 30, 2012

(54) PLUG-IN CONNECTOR

(76) Inventors: Max Kronenberg, Solingen (DE); Ralf M. Kronenberg, Haan (DE)

( * ) Notice: Subject to any disclaimer, the term of this patent is extended or adjusted under 35 U.S.C. 154(b) by 207 days.

(21) Appl. No.: 12/594,231

(22) PCT Filed: Mar. 18, 2008

(86) PCT No.: PCT/EP2008/002123
§ 371 (c)(1),
(2), (4) Date: Oct. 1, 2009

(87) PCT Pub. No.: WO2008/119461
PCT Pub. Date: Oct. 9, 2008

(65) Prior Publication Data
US 2010/0074679 A1    Mar. 25, 2010

(30) Foreign Application Priority Data
Apr. 2, 2007   (DE) .................. 20 2007 004 924 U

(51) Int. Cl.
*F16B 7/00*    (2006.01)
(52) U.S. Cl. ....................... 403/292; 403/297
(58) Field of Classification Search ............. 403/292, 403/293, 298; 52/204.61, 456, 665, 586.1, 52/655.1, 848
See application file for complete search history.

(56) References Cited

U.S. PATENT DOCUMENTS

| | | | | |
|---|---|---|---|---|
| 3,932,046 A * | 1/1976 | Kawazu | ................. | 403/172 |
| 4,049,355 A * | 9/1977 | Kawazu | ................. | 403/172 |
| 4,608,802 A * | 9/1986 | Bayer | ................. | 52/786.1 |
| 4,970,840 A * | 11/1990 | Ouellette et al. | ........... | 52/204.61 |
| 5,209,599 A * | 5/1993 | Kronenberg | .................. | 403/298 |
| 6,244,012 B1 * | 6/2001 | McGlinchy et al. | ............ | 52/665 |
| 6,398,449 B1 * | 6/2002 | Loh | ................. | 403/280 |
| 6,406,213 B1 * | 6/2002 | Dohman et al. | ............. | 403/298 |
| 6,431,784 B1 * | 8/2002 | Kronenberg | .................. | 403/297 |
| 6,709,187 B2 * | 3/2004 | Loh | ................. | 403/298 |
| 6,739,101 B2 * | 5/2004 | Trpkovski | ................. | 52/206 |
| 6,764,247 B1 * | 7/2004 | Kronenberg | .................. | 403/292 |
| 7,685,782 B2 * | 3/2010 | Pettit et al. | ................. | 52/204.61 |
| 2004/0088943 A1 * | 5/2004 | Kronenberg | .................. | 52/656.9 |
| 2005/0214100 A1 * | 9/2005 | Kronenberg et al. | ......... | 411/458 |
| 2006/0185294 A1 * | 8/2006 | Langer et al. | .................. | 52/456 |

FOREIGN PATENT DOCUMENTS

| | | |
|---|---|---|
| DE | 26 27 920 | 12/1977 |
| DE | 92 16 955 U1 | 5/1994 |
| DE | 94 11 067.0 | 10/1994 |
| DE | 93 19 463.3 | 4/1995 |
| DE | 299 09 413 U1 | 11/2000 |

(Continued)

*Primary Examiner* — Joshua Kennedy
(74) *Attorney, Agent, or Firm* — McGlew and Tuttle, P.C.

(57) ABSTRACT

A plug-in connection (1) is provided for hollow profiled elements (2) of spacer holding frames for insulating glass panes. The plug-in connector (1) has at least one connector part (3, 4) including an essentially U-shaped or box-type cross-section, having lateral walls (15, 16), at least one central wall (14), and, on the connection point (8), a central abutment (18) with a plurality of elastic abutment elements (19, 20), on the edge region of the lateral walls (15, 16). The central abutment includes two mutually oriented individual abutment elements (19, 20) which are arranged on both sides of the connection point (8), each on a lateral wall (15, 16), and have a cushioning effect essentially in the plane of the associated lateral wall (15, 16) thereof. The lateral wall (15, 16) have a recess (26) beneath the abutment element (19, 20).

19 Claims, 5 Drawing Sheets

FOREIGN PATENT DOCUMENTS

| | | |
|---|---|---|
| DE | 201 01 486 U1 | 7/2002 |
| DE | 202004004734 U1 | 10/2005 |
| DE | 202004013686 U | 2/2006 |
| DE | 202005004601 U1 * | 3/2006 |
| DE | 102004054602 B | 7/2006 |
| EP | 0 133 655 B1 | 3/1985 |

* cited by examiner

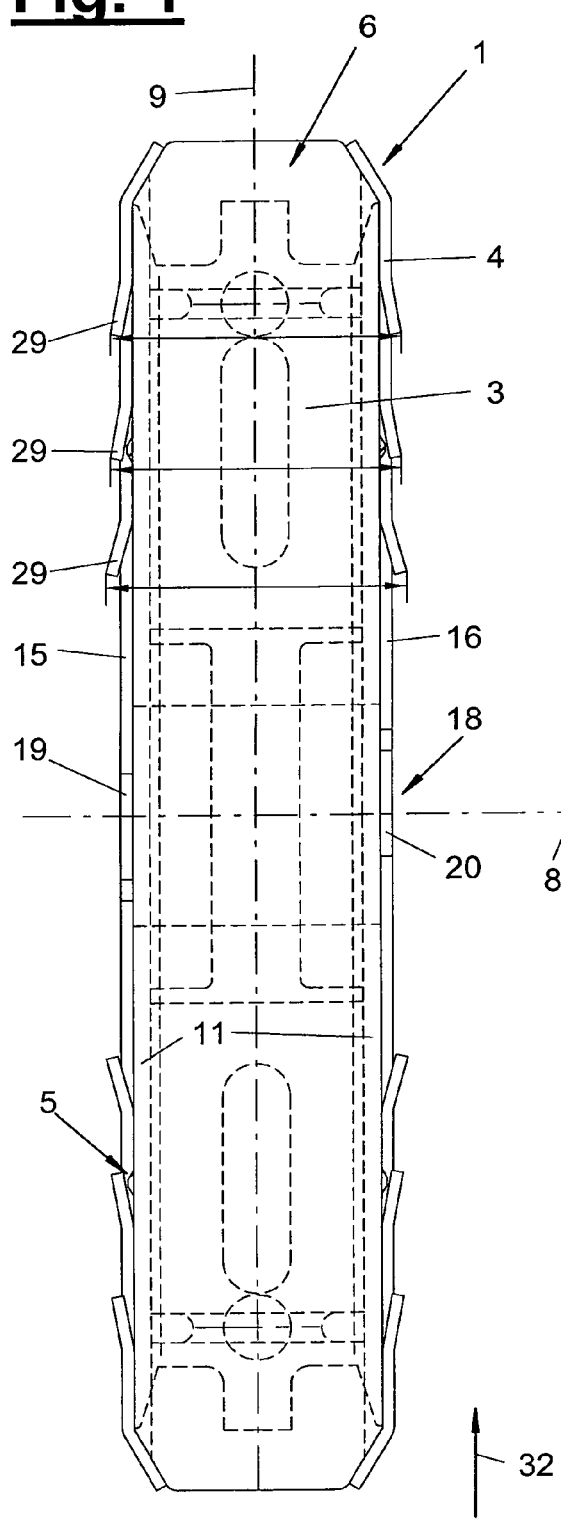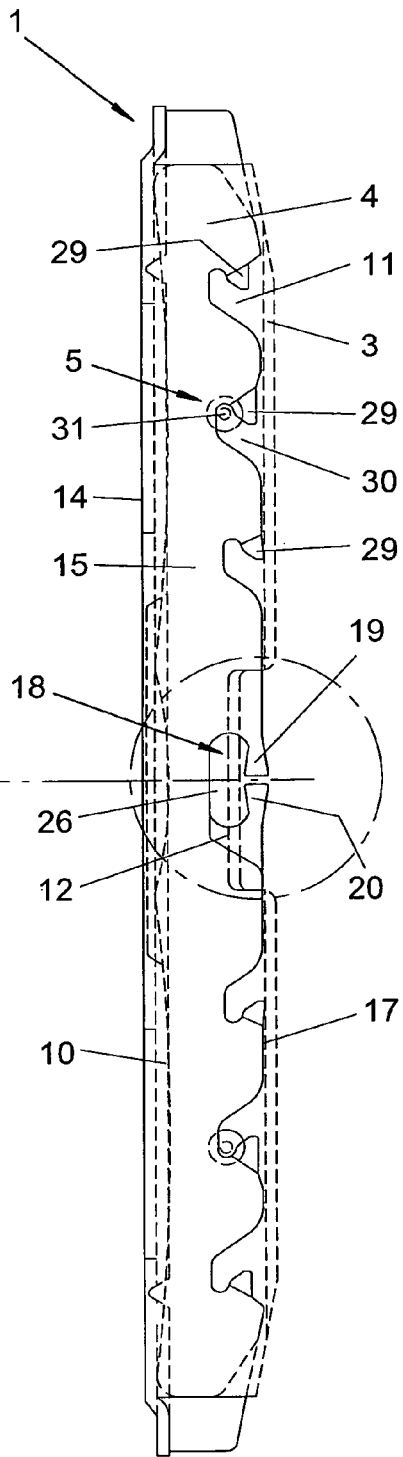

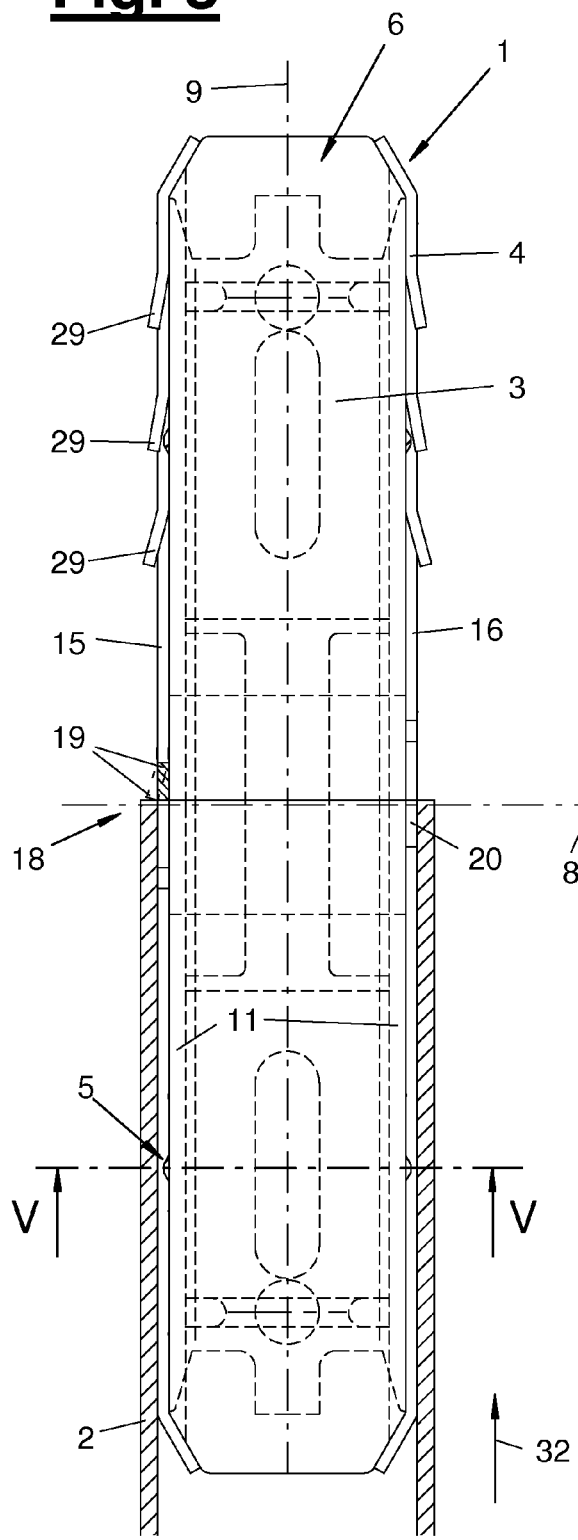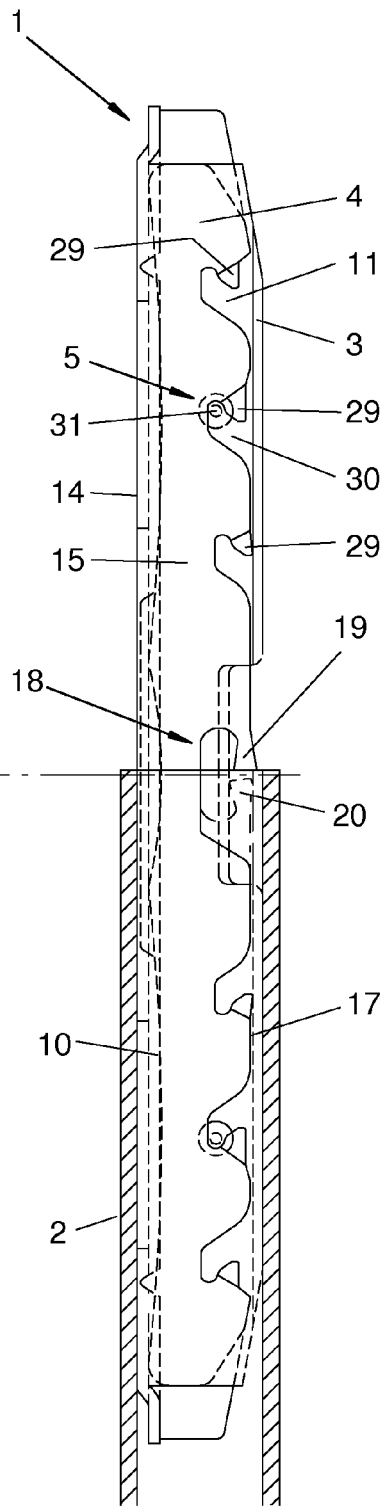

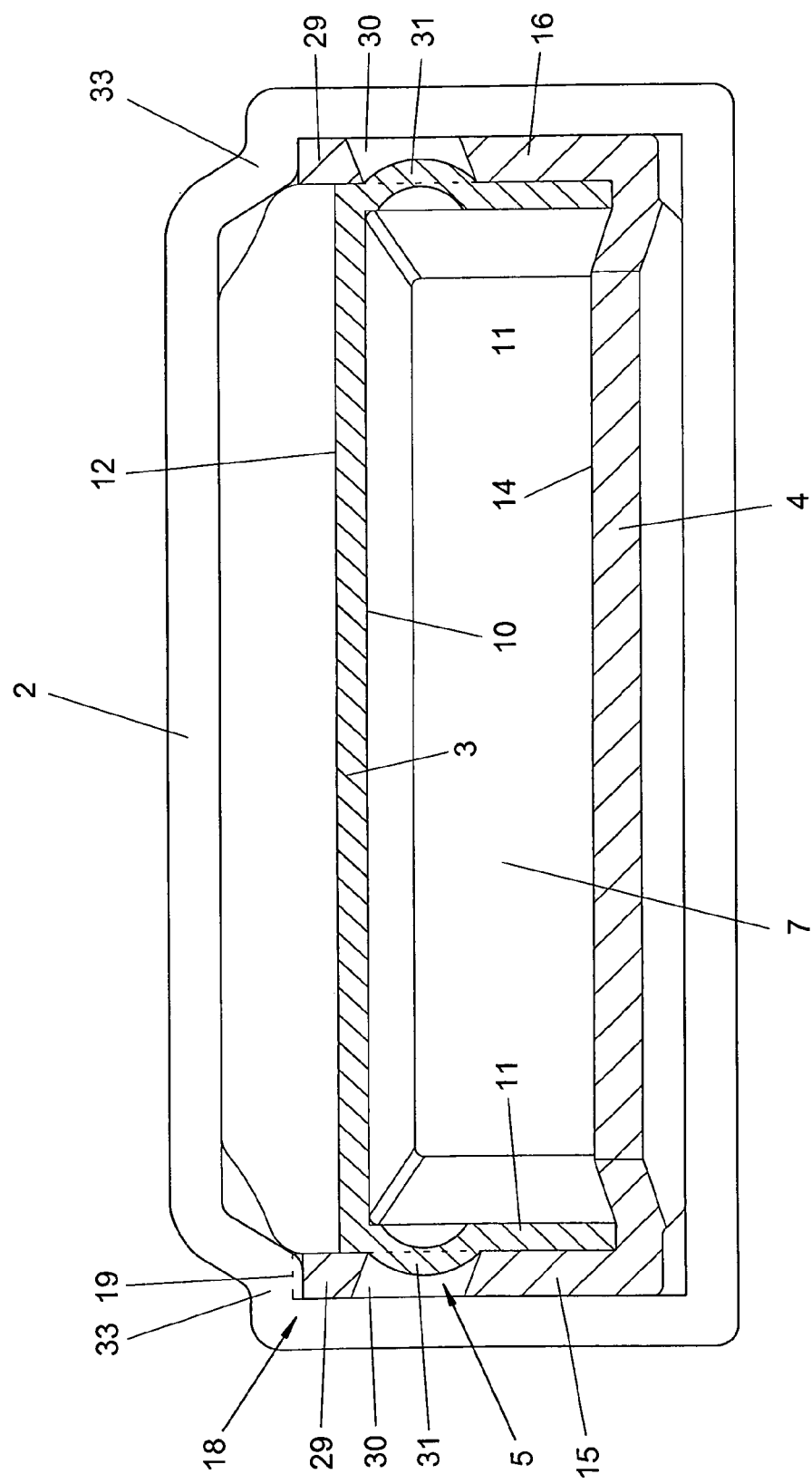

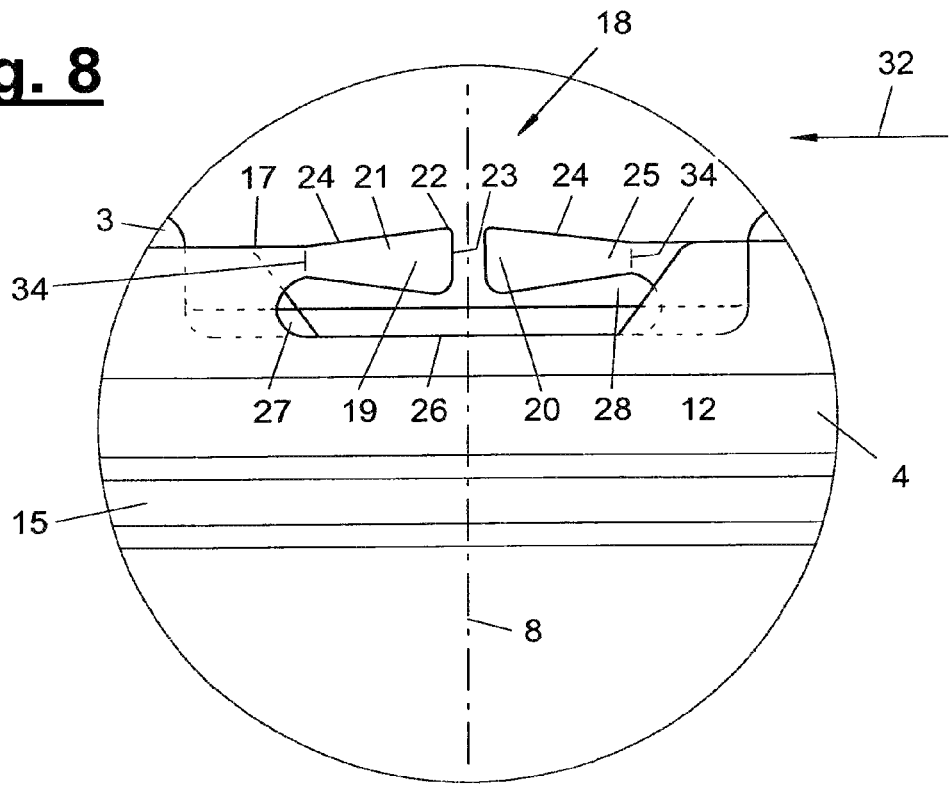
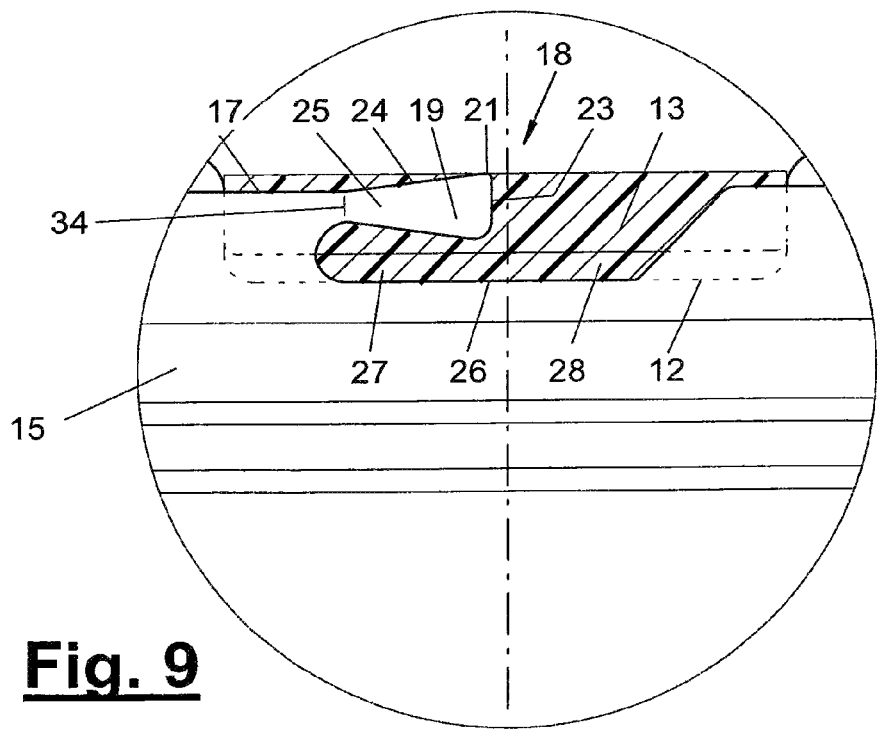

PLUG-IN CONNECTOR

CROSS REFERENCE TO RELATED APPLICATIONS

This application is a United States National Phase application of International Application PCT/EP2008/002123 and claims the benefit of priority under 35 U.S.C. §119 of German Patent Application DE 20 2007 004 924.2 filed Apr. 2, 2007, the entire contents of which are incorporated herein by reference.

FIELD OF THE INVENTION

The present invention pertains to a plug-in connector for hollow sections of spacer frames for insulating glass panes, whereby the plug-in connector has at least one connector part with an essentially U-shaped or box-shaped cross section with side walls and at least one middle wall as well as a center stop with elastic stop elements at a connection point at an edge area of the side walls.

BACKGROUND OF THE INVENTION

Such a straight plug-in connector for hollow sections of spacer frames in insulating glass panes has become known from DE 20 2004 004 734. It is designed as having two parts, whereby the U-shaped connector parts can be plugged into one another in a positive-locking manner and can be fixed. The outer connector part has, in the area of the connection point, a center stop, which consists of four laterally deflected spring bosses, which make a spring motion transversely to the wall plane. The elastic stop elements are arranged at each side wall in pairs and on both sides of the connection point. They are located at the free edge of the side walls, which have a reduced height in this area. The inner connector part has a depression in the middle area and constrictions on both sides, as a result of which clearances are created for receiving a sealant. Due to the depressed side walls of the outer connector part, the sealant can come into contact with the inner wall of the pushed-on spacer hollow sections. Their supportive cross section is reduced by the depression of the outer side walls.

DE 94 11 067 U1 shows a one-part, U-shaped plug-in connector, in which the middle stop consists of two bending-resistant stop dogs acting on one side and directed opposite one another. Each of the side walls carries one of these rigid stop dogs at its edge, which are arranged on both sides of the connection point. The stop dogs have a wedge shape with a guide slope and a steeply rebounding stop edge. During pushing on, the hollow sections slide on the guide slope of one stop dog and abut against the stop edge of the other stop dog. Due to the sliding onto the rigid guide slope, the hollow sections are raised on one side and rotate somewhat about their longitudinal axis. Moreover, this motion brings about a sufficient height clearance of the plug-in connector in the hollow sections.

SUMMARY OF THE INVENTION

The object of the present invention is to show a plug-in connector improved with respect to the stop design.

According to the invention, a plug-in connector is provided for hollow sections of spacer frames for insulating glass panes. The plug-in connector includes a connector part comprising an essentially U-shaped or box-shaped cross section with side walls and at least one middle wall. A center stop is provided comprising two separate elastic stop elements including a first elastic stop element directed opposite to a second elastic stop element with said first elastic stop element arranged on a first side of the connection point at a side wall with said second elastic stop element arranged on a second side of the connection point at another side wall, said two separate elastic stop elements being essentially elastic in a plane of an associated side wall.

The claimed embodiment of the center stops, which can be used for one-part and multipart plug-in connectors, offer various advantages. The elastic stop elements can yield elastically during the slipping over of a hollow section, whereby they move transversely to their lengthwise extension or essentially in the plane of its associated side wall and about a bending axis, which is aligned transversely to the lengthwise extension of the plug-in connector. The width of the stop element can be greater than the wall thickness in the bending area. The arrangement of only two stop elements lying diagonally opposite one another is sufficient here, which reduces the resistance during the pushing on of the hollow profiles and provides for a reliable stopping function, on the other hand.

With the two stop elements acting on one side and offset opposite one another with respect to the longitudinal and middle axes of the plug-in connector, a better stopping function than in the state of the art can be achieved. Compared to fixed stops, the raising on one side there and rotating on the opposite side of the hollow sections is avoided. In the embodiment claimed, the hollow sections can be in alignment with their walls in the stopped position. This is also favorable for the tightness of the connection point and for the application of an optional additional sealant.

Compared to prior-art arrangements in pairs of four laterally deflected spring bosses, the retaining effect and the stopping function are improved. In the embodiment claimed, the vertical stop edge acts on a transversely or obliquely lying wall element of the hollow section, e.g., a shoulder of the hollow section on the edge side and offers a higher impact and contact accuracy. Moreover, the stop element in the embodiment claimed does not have to be deflected. The elastic stopping function is, rather, achieved by the shaping of the stop elements. Consequently, the stopping function also does not depend on the degree of deflection as in the state of the art. There, the stop edges of the laterally deflected spring bosses cooperate with parallel aligned side walls of the hollow profiles, whereby the impact accuracy depends on the degree of deflection and on the available tolerances. Laterally deflected spring bosses can be overwound or underwound in case of unfavorable tolerances. The claimed stop elements are, on the other hand, considerably less sensitive to tolerances and offer a higher operating and stop reliability. The stop elements elastically pressed away by the hollow sections cling to the hollow section wall even better with their apex or the consequently formed edge and prevent, together with other retaining elements, a pulling away and detaching of the hollow sections from the plug-in connector.

For the yielding function of the stop elements, it is advantageous to form a recess in the side wall under the stop elements, which recess at the same time represents a wall opening. This makes possible the passing through of an optionally present sealant, which thus can come into contact with the adjacent inner wall of the hollow sections in the area of the connection point and which permits a three-sided sealing of the connection point. In this case, the recess may be greater than the stop element and may offer a correspondingly enlarged passage surface to the sealant. The arrangement of only two stop elements is especially advantageous here, because the enlargement of the passage surface and of the sealing action can be achieved without reducing the wall height and without significant loss in mechanical strength.

This function is especially favorable in connection with multipart plug-in connectors, in which the other connector part has a receiver for a sealant. Compared to prior-art multipart plug-in connectors, the other advantage here is that the supportive height of the side wall can be greater than in the state of the art, whereby, nevertheless, a good sealing function is given. Moreover, lateral constrictions in the inner part may be dispensed with. This makes it possible to reduce the size of the clearances provided for the sealant and thus also to reduce the amount of sealant. This reduces the cost effort as well as the design effort of the plug-in connector. Moreover, its mechanical stability, especially the bending strength in the area of the connection point, is improved. The type of clip connection between the connector parts contributes to the bond and to increasing the mechanical strength. The claimed plug-in connector is also especially favorable to produce and to handle.

The present invention is shown as an example and schematically in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a top view of a plug-in connector with a center stop;

FIG. 2 is a tilted lateral view showing the plug-in connector with a center stop;

FIG. 3 is a top partially sectional view showing the plug-in connector of FIGS. 1 and 2 with a hollow section pushed on on one side;

FIG. 4 is a side partially sectional view showing the plug-in connector of FIGS. 1 and 2 with a hollow section pushed on on one side;

FIG. 5 is a cross sectional view through the plug-in connector and the hollow section according to intersection line V-V of FIG. 3;

FIG. 8 is an enlarged detail view of the center stop of a second variant, shown without sealant; and FIG. 9 is an enlarged detail view of the center stop of the second variant, shown with sealant

DESCRIPTION OF THE PREFERRED EMBODIMENTS

Figure 6:
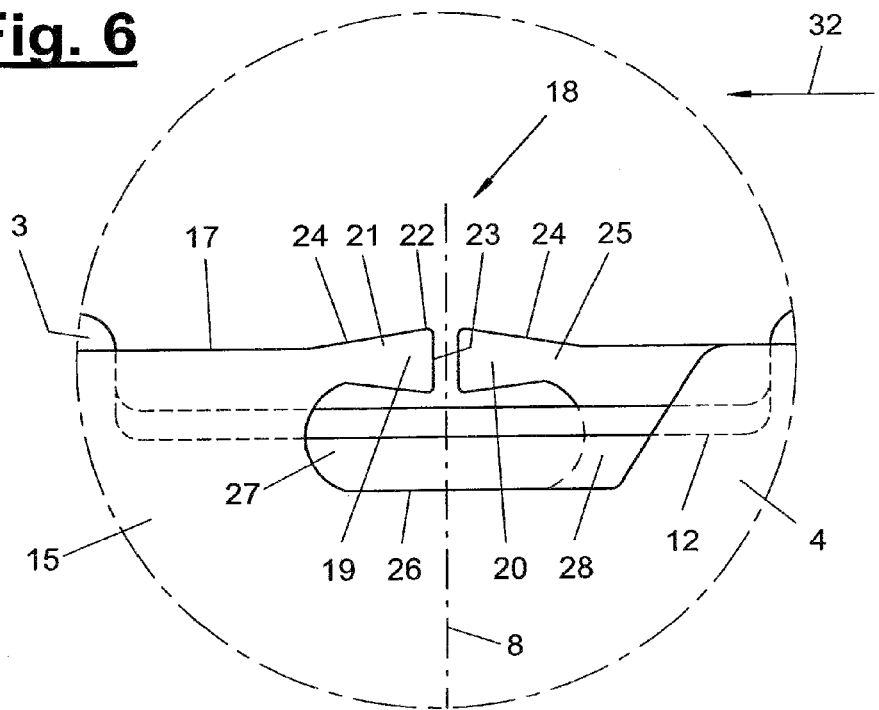
FIG. 6 is an enlarged detail view of the center stop of a first variant, shown without sealant.

Referring to the drawings in particular, the present invention pertains to a plug-in connector (1), especially a straight plug-in connector, for hollow sections (2) of spacer frames for insulating glass panes. The plug-in connector may consist of one part. As an alternative, it may consist of two or more connector parts (3, 4). In the exemplary embodiments, a two-part plug-in connector is shown as an example, which consists of an inner connector part (3) and outer connector part (4), which can be plugged together in a positive-locking manner and be locked in the plugged-in position by means of a positive-locking connection (5).

The one-part plug-in connector (1) or the outer connector part (4) has an essentially U-shaped or box-shaped cross section, which consists of side walls (15, 16) and one or more middle walls (14).

In the exemplary embodiments shown, a U shape is available, whereby the side walls (15, 16) are connected to one another at one edge by means of a middle wall (14) or a cross web. The fitting position of the plug-in connector (1) in the hollow sections (2) plugged in on both sides is randomly selectable. In the exemplary embodiment shown, the middle wall (14) points to the bottom area of the hollow sections (2) and to the frame inside or to the inside of the insulating glass pane.

In the multipart plug-in connector (1) shown, the inner part (3) may likewise have a U-shaped or box-shaped cross section with two side walls (11) and at least one middle wall (10). In the plugged-together position, the side walls (11, 15, 16) lie adjacent and essentially parallel to one another, whereby the middle wall (11) of the inner part (3) in the embodiment shown points to the outside of the frame and to the roof area of the hollow sections (2). FIG. 5 illustrates this arrangement in a cross section.

The one-part plug-in connector (1) or outer part (4) has a center stop (18), which is arranged at the provided connection point (8) of the hollow sections (2). At the same time, the connection point (8) is preferably the middle of the plug-in connector (1) in the lengthwise direction. The longitudinal axis of the plug-in connector (1) or its connector parts (3, 4) has the reference number (9). The center stop (18) has two elastic stop elements (19, 20), which are arranged at the edge area (17) of the side walls (15, 16) of the plug-in connector (1) or of the outer part (4). In the embodiment shown, this is the free edge of the side walls (15, 16). The two stop elements (19, 20) are designed as elastic stop dogs or spring bosses acting on one side. The two stop elements (19, 20) have a cantilever extent and are directed opposite one another and are each arranged at a side wall (15, 16) on both sides of the connection point (8). The stop elements (19, 20) are, as a result, arranged opposite one another with respect to the middle axis or connection point (8) and offset to the connector longitudinal axis (9).

The stop elements (19, 20) lie essentially in the plane of their associated side wall (15, 16) and also move essentially in this plane in their spring motion. The side walls (15, 16) have each a recess (26) under their stop element (19, 20). The stop element (19, 20) may thereby be cut out from its side wall (15, 16) and form a component of the side wall (15, 16). The stop elements (19, 20) may have the same wall thickness as the associated side wall (15, 16). As FIGS. 6, 7 and 8, 9 illustrate, the recess (26) may have a greater length than the stop element (19, 20) and extend beyond the connection point (8). Consequently, a clearance (27) is formed under the stop element (19, 20) and beyond the connection point (8) a free space (28) is formed in front of the stop element (19, 20). The recess edge at the edge of the free space (28) may be designed as notch-favorable inclined rise and transfer into the subsequent free edge (17) of the respective side wall (15, 16). In the bottom area, the recess (26) has an essentially straight edge, which extends along the connector axis (9). The clearance (27) has a notch-favorable round recess contour. In the area of the free space (28), the recess (26) is open upwards in the direction of the edge (17).

The stop element (19, 20) has an apex (22), which lies above the edge (17), at its end facing towards the connection point (8). The stop element (19, 20) has a wedge-shaped head part, which widens towards the connection point (8), and has a constriction (25) or a tapering on the opposite rear side. This may have a width that is greater than the side wall thickness. A wall weakness is formed by means of the constriction (25) and improves the elasticity of the head part (21).

On its front side directed towards the connection point (8) the head part (21) has a vertical stop edge (23), which extends preferably in a straight line and transversely to the connector longitudinal axis (9) as well as towards the direction of plugging in (32). At the apex (22), the stop edge (23) passes into a guide slope (24) at the upper side of the head part (21). The stop edge (23) protrudes through the widened head part (21) upwards over the edge (17) and consequently forms a reliable stop for the hollow section (2) pushed on in the direction of plugging in (32).

As FIG. 5 illustrates, the one-part or multipart plug-in connector is adapted, in its shaping, to the inner shape of the hollow sections (2). In particular, the height of the external side walls (15, 16) is adapted to the section inner height. The hollow section (2) may have an essentially rectangular cross section. It may also have the indentation on both sides in the roof area shown in the exemplary embodiment and bent transition between the side wall and the roof wall. Consequently, a shoulder (33) is formed, which has a wall area running transversely to the side wall at least in terms of area, upon which the stop elements (19, 20) act.

As FIGS. 3 through 5 illustrate, the hollow section (2), first plugged in on the lower leg area of the plug-in connector (1), crosses the stop element (20) at the side wall (16) and elastically presses this stop element by sliding on its guide slope (24) downwards into the recess (26). The stop edges (23) of the two stop elements (19, 20) are spaced axially a little bit from the connection point (8). After crossing the stop element (20), the hollow section (2) stops with its shoulder (33) at the stop edge (23) of the other stop element (19). If subsequently the other hollow section (not shown) is pushed onto the other connector leg, this presses the stop element (19) with its shoulder downwards into the recess (26) and then stops with its end face at the first hollow section (2). Consequently, a tight and essentially gap-free connection of the hollow sections (2) can be formed.

The plug-in connector (1) may have a receiver (12) for a sealant (13) in the area of the connection point (8). The sealant (13) may have a different consistency and shape. It may consist, e.g., of a plastic butyl compound. As an alternative, as an elastically shapable sealing pad, it may consist of a foam-plastic or the like. The sealant (13) may be applied to the connector (1) by the manufacturer. As an alternative, it may be applied or filled in at a later date and especially during the plugging in of the hollow sections (2).

Figure 7:
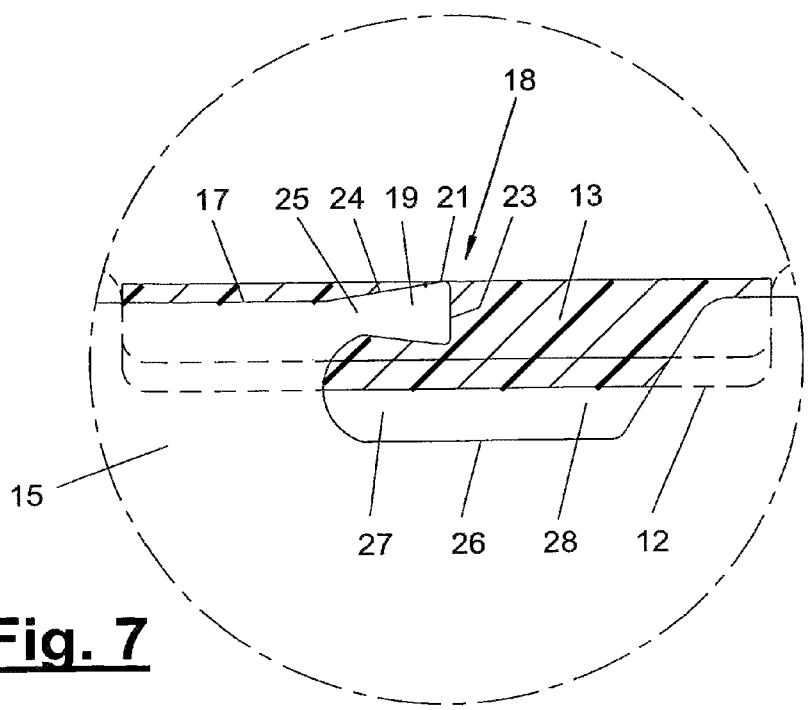
FIG. 7 is an enlarged detail view of the center stop of the first variant, shown with sealant.

In a one-part plug-in connector (1) (not shown), the receiver (12) may, for example, be formed by a shortened roof wall, which extends transversely between the side walls (15, 16). In a multipart plug-in connector (1), the inner part (3) may have a trough-shaped depression at its middle wall (10) pointing outwards, which depression forms the receiver (12) for the sealant (13), as shown in the embodiment. The receiver (12) may extend on both sides up to the external side walls (15, 16). The receiver (12) and the sealant (13) lie at the level of the center stop (18) and of the recess (26) at least in terms of area. FIG. 7 illustrates this embodiment. Consequently, the sealant (13) can penetrate the recess (26) at least in terms of area and come into contact with the adjacent inner wall of the hollow sections (2). To achieve this penetration, the sealant (13) may have an excess in the starting state and may be displaced to the side by the pushed-on hollow sections (2) and the accompanying spatial constriction.

In the variants of FIGS. 6, 7 and 8, 9 the clearance (27) and the recess (26) have a different height. In the embodiment of FIGS. 6 and 7, they reach deeper down to below the edge of the receiver or depression (12), as a result of which a large opening for the passing through of the sealant (13) is formed. In FIGS. 8 and 9, the lower edge of the recess (26) lies higher and somewhat flush with the lower edge of the receiver (12). As a result, the recess (26) has a smaller size, whereby, on the other hand, the web height of the side wall (15, 16) is enlarged, which is favorable for the connector stability under bending load.

Moreover, FIGS. 8 and 9 illustrate an embodiment, in which the stop elements (19, 20) can be slightly deflected laterally outwards at a, e.g., vertical or inclined bending edge (34). The stop elements (19, 20) are thereby laterally somewhat flared from their side wall plane. This is shown as an alternate position in dash line in FIG. 3. Hereby, they retain their elastic yieldability in height or in the plane of their associated side wall (15, 16).

The positive-locking connection (5) of the inner and outer connector parts (3, 4) can be embodied in any suitable manner and, e.g., according to DE 20 2004 004 734 U1. In the embodiment shown, a different variant is shown, in which the inner connector part (2, 3) has at the side walls (11) on both sides of the connection point (8) at least one projection (10) directed outwards, which is embodied, e.g., as a curvature or bulge of the side wall (11). The outer connector part (4) may have one or more retaining elements (29), which are embodied, e.g., as cut-out and laterally deflected spring bosses, at its external side walls (15, 16) and in particular at their edge (17). As FIGS. 1 and 2 illustrate, the retaining elements (29) may have different heights compared to the middle wall (14) and be laterally flared to different widths. Consequently, they act on the hollow section inner wall in various trace amounts. A wall opening (30), which reaches to the edge (17) and is accessible from there, is formed under the retaining elements (29) by the cutout. By means of this wall opening (30), the projection (31), which is designed, e.g., as a clip knob, can mesh in a positive-locking manner and be fixed under the retaining element (29). The retaining elements (29) at the two legs on both sides of the connection point (8) are directed opposite one another, such that the projections (31) and the wall openings (30) form a clip connection that is positive locking and secures the position of the connector part.

The plug-in connector (1) or its connector parts (3, 4) may consist of any suitable material, e.g., plastic, metal or other materials, whereby composite materials are also possible. In the embodiments shown they are punched and bent parts made of thin-walled steel plate. Plastic parts may be injected or cast. Cast metal parts are possible as well.

The one-part or multipart plug-in connector (1) may selectively have open or closed end faces (6). It may have a cavity (7) in the inner area. In case of open end faces (6), a passage of the granulated desiccant found in the hollow sections (2) over the connection point (8) is consequently possible.

Variations of the embodiments shown and described are possible in various ways. On the one hand, the fitting position may be reversed, whereby the middle wall (14) points to the frame outside and to the roof area of the hollow sections (2) and the stop elements (19, 20) come into contact with the bottom wall of the hollow sections (2). The plug-in connector (1) may have a one-part design in the manner mentioned in the introduction. Moreover, the plug-in connector (1) does not have to have sealant (13). In another variation, the one-part or multipart plug-in connector (1) may have more than two stop elements (19, 20). In this case, e.g., four stop elements may be present, which are arranged in pairs at each side wall (15, 16) and lie opposite one another at the connection point (8). The wedge shape of the head part (21) of the stop elements (19, 20) with the raised apex (22) and the constriction (25) with the improved spring action in the height direction of the side wall (15, 16) has independent inventive significance and is independent of the number, arrangement and optional lateral deflection of the stop elements (19, 20) and of the consequently formed center stops (18). The center stop (18) may, moreover, still have other and preferably elastic stop elements at other points of the one-part or multipart plug-in connector (1), e.g., at the external middle wall (14). Furthermore, the plug-in connector (1) may have closed end faces (6) and an interior sealed against the passage of granules by means of cross webs or the like. Furthermore, the center stop (18) shown and described can also be used for plug-in connectors for bar sections or the like.

While specific embodiments of the invention have been described in detail to illustrate the application of the principles of the invention, it will be understood that the invention may be embodied otherwise without departing from such principles.

The invention claimed is:

1. A plug-in connector for hollow sections of spacer frames for insulating glass panes, the plug-in connector comprising:
a connector part comprising:
    an essentially U-shaped or box-shaped cross section with side walls and at least one middle wall; and
    a center stop comprising a plurality of elastic stop elements at a connection point at the edge area of the side walls, wherein the center stop has two separate stop elements directed opposite each other, said two separate stop elements being arranged on both sides of the connection point with only one of said stop elements at one of said side walls and with only one of said stop elements at another of said side walls and with said stop elements each being essentially elastic in the plane of said one of said side walls and said another of said side walls, respectively, to elastically move transversely to a lengthwise extension with respect to the adjacent side wall wherein each of the stop elements has a head part which is wedge-shaped and widens towards the connection point and the head part has a constriction on a rear side, wherein each of the stop elements has an elastic stop inner edge angled toward an outer side of the associated wall, from a stop end toward the constriction, and with an elastic stop outer edge angled away from the outer side of the associated wall, from the stop end toward the constriction.

2. A plug-in connector in accordance with claim 1, wherein the side wall has a recess under each of the stop elements.

3. A plug-in connector in accordance with claim 2, wherein the recess has a greater length than a length of each of the stop elements.

4. A plug-in connector in accordance with claim 2, wherein the recess extends beyond the connection point.

5. A plug-in connector in accordance with claim 1, wherein each of the stop elements is cut out from the side wall.

6. A plug-in connector in accordance with claim 1, wherein each of the stop elements has an apex, which lies above an edge of the side wall.

7. A plug-in connector in accordance with claim 1, wherein each of the stop elements is laterally somewhat flared from its side wall plane.

8. A plug-in connector in accordance with claim 1, wherein the connector part further comprises at least one retaining element with a wall opening that is arranged at the side walls.

9. A plug-in connector in accordance with claim 1, wherein the plug-in connector comprises said connector part as an outer connector part and an inner connector part to provide at least two connector parts that can be plugged into one another, each with an essentially U-shaped or box-shaped cross section, whereby the center stop is arranged at the outer connector part.

10. A plug-in connector in accordance with claim 9, further comprising a deformable sealant wherein the inner connector part has a receiver for the deformable sealant in the area of the connection point.

11. A plug-in connector in accordance with claim 10, wherein the sealant is arranged, at least in terms of area, at the level of the recesses of the stop elements.

12. A plug-in connector in accordance with claim 9, wherein the connector parts have a positive-locking connection with the outer connector and inner connector plugged into one another.

13. A plug-in connector in accordance with claim 9, wherein:
    the connector parts have adjacent side walls;
    the connector parts plugged into one another form a plugged-in position, whereby the inner connector part has, at the side walls, at least one projection, which meshes with a wall opening under a retaining element of the outer connector part.

14. A plug-in connector for hollow sections of spacer frames for insulating glass panes, the plug-in connector including a connector part comprising:
    an essentially U-shaped or box-shaped cross section with a first side wall with a first wall recess and with a second side wall with a second wall recess and with at least one middle wall; and
    a center stop comprising two separate elastic stop elements including a first elastic stop element having a first cantilever extent, extending from the first side wall in a first direction and having a first elastic stop inner edge along the first wall recess and having a first elastic stop outer edge at an opposite outer side and a second elastic stop element having a second cantilever extent, extending from the second side wall in a second direction and having a second elastic stop inner edge along the second side wall recess and having a second elastic stop outer edge at an opposite outer side, the first direction being directed opposite to the second direction, said first elastic stop element being arranged on a first side of a connection point with said second elastic stop element arranged on a second side of the connection point, said two separate elastic stop elements being essentially elastic in a plane of an associated side wall wherein said first elastic stop element has a wedge-shape that widens towards the connection point from a first stop constriction inwardly of the connection point and with the first elastic stop inner edge angled toward the opposite outer side of the first wall, from the connection point toward the first stop constriction, and with the first elastic stop outer edge angled toward the first wall recess, from the connection point toward the first stop constriction, and wherein said second elastic stop element has a wedge-shape that widens towards the connection point from a second stop constriction inwardly of the connection point and with the second elastic stop inner edge angled toward the opposite outer side of the second wall, from the connection point toward the second stop constriction, and with the second elastic stop outer edge angled toward the second wall recess, from the connection point toward the second stop constriction.

15. A plug-in connector in accordance with claim 14, wherein the stop elements are each cut out from an associated side wall, wherein the recess has a greater length in the first direction or in the second direction than the stop element in the first direction or in the second direction.

16. A plug-in connector in accordance with claim 14, further comprising another connector part provided as an inner connector part plugged into said connector part as an outer connector part, whereby the center stop is arranged at the outer connector part.

17. A plug-in connector in accordance with claim 16, further comprising:
a deformable sealant, wherein the inner connector part has a receiver for the deformable sealant in the area of the connection point.

18. A plug-in connector for hollow sections of spacer frames for insulating glass panes, the plug-in connector including a connector part comprising:
an essentially U-shaped or box-shaped cross section with a first side wall with a first wall recess and with a second side wall with a second wall recess and with at least one middle wall connecting the first side wall to the second side wall;
a first elastic stop element defined by a first cantilever extent extending from the first side wall in a first direction as an only first side wall stop element, said first elastic stop element comprising a first elastic stop inner edge along the first wall recess and comprising a first elastic outer edge at an opposite outer side, said first elastic stop element having a first stop head part with a wedge-shape that widens towards a first stop end, from a first stop constriction inwardly of the first stop end, and with the first elastic stop inner edge angled toward the opposite outer side of the first wall, from the first stop end toward the first stop constriction, and with the first elastic stop outer edge angled toward the first wall recess, from the first stop end toward the first stop constriction;
a second elastic stop element defined by a second cantilever extent extending from the second side wall in a second direction as an only second side wall stop element, the second elastic stop element comprising a second elastic stop inner edge along the second side wall recess and comprising a second elastic stop outer edge at an opposite outer side, said second elastic stop element having a second stop head part with a wedge-shape that widens towards a second stop end, from a second stop constriction inwardly of the connection point, and with the second elastic stop inner edge angled toward the opposite outer side of the second wall, from the second stop end toward the second stop constriction, and with the second elastic stop outer edge angled toward the second wall recess, from the second stop end toward the first stop constriction, wherein:
the first direction is directed opposite to the second direction;
the first elastic stop element is arranged on a first side of the connection point;
said second elastic stop element is arranged on a second side of the connection point; and
said two separate elastic stop elements are essentially elastic in a plane of an associated side wall and together form a center stop.

19. A plug-in connector in accordance with claim 18, further comprising another connector part, wherein:
said another connector part is provided as an inner connector part;
said connector part is provided as an outer connector part;
said inner connector part is plugged into said outer connector part.

* * * * *